United States Patent [19]
McPherson et al.

[11] Patent Number: 5,454,540
[45] Date of Patent: Oct. 3, 1995

[54] SUCTION CUP RELEASE MECHANISM

[75] Inventors: Gary McPherson, 14888 - 41 Ave., Edmonton, Alberta, Canada, T6H 5N7; James Dickinson, Prince George, Canada

[73] Assignee: McPherson; Gary, Edmonton, Canada

[21] Appl. No.: 239,301

[22] Filed: May 6, 1994

[51] Int. Cl.⁶ .................................................. A45D 42/14
[52] U.S. Cl. ........................................ 248/362; 248/205.8
[58] Field of Search .................... 248/205.8, 683, 248/362, 363, 309.3, 205.9, 206.3, 205.6

[56] References Cited

U.S. PATENT DOCUMENTS

| | | | |
|---|---|---|---|
| 1,597,786 | 8/1926 | Hamel | 248/362 X |
| 1,644,683 | 10/1927 | Leipert | 248/362 X |
| 2,124,748 | 7/1938 | Ransom | 248/362 X |
| 2,812,614 | 11/1957 | Ladyman | 248/362 X |
| 4,846,429 | 7/1989 | Scheurer | 248/205.8 |
| 4,932,701 | 6/1990 | Cornillier et al. | 294/64.1 |
| 5,020,754 | 6/1991 | Davis et al. | 248/206.3 |
| 5,176,357 | 1/1993 | Hobart | 248/205.8 X |

*Primary Examiner*—J. Franklin Foss
*Attorney, Agent, or Firm*—Anthony R. Lambert

[57] ABSTRACT

A suction cup release mechanism is described which includes a lever pivotally mounted to a support. A linkage member extends from the lever to a suction cup at a remote end of the support. The linkage member is secured to a peripheral edge of the suction cup. Upon the lever being pivoted, a force is exerted by the linkage member to draw the peripheral edge of the suction cup away from a surface to which it is adhering until suction maintaining the suction cup in position is released.

3 Claims, 4 Drawing Sheets

SUCTION CUP RELEASE MECHANISM

The present invention relates to a suction cup release mechanism.

BACKGROUND OF THE INVENTION

There are many products for which a suction cup release mechanism is useful. One example, is a bathing chair. Bathing chairs are intended to be placed in a bathtub or shower enclosure. They have suction cups on the legs so that the chair firmly grips the bathtub or shower enclosure to prevent accidental movement. Such bathing chairs are used primarily by elderly or handicapped persons.

Once in position, it is extremely difficult for elderly or handicapped persons to remove the bathing chair as the suction cups hold the chair firmly to the bathtub or shower enclosure.

SUMMARY OF THE INVENTION

What is required is a suction cup release mechanism which is suitable for use on products such items as bathing chairs.

According to the present invention there is provided a suction cup release mechanism including a lever pivotally mounted to a support. A linkage member extends from the lever to a suction cup at a remote end of the support. The linkage member is secured to a peripheral edge of the suction cup. Upon the lever being pivoted, a force is exerted by the linkage member to draw the peripheral edge of the suction cup away from a surface to which it is adhering until suction maintaining the suction cup in position is released.

With the release mechanism, as describe above, the lever in combination with the linkage member provides a mechanical advantage sufficient to enable the suction cup to be released with relatively little force being applied.

Although beneficial results may be obtained through the use of the suction cup release mechanism as defined above, costs can be reduced if it is possible to easily retrofit exiting chairs, tables, and the like. Even more beneficial results may, therefore, be obtained when the suction cup release mechanism is in the form of a tubular sleeve having a first end, a second end, and an interior bore adapted to telescopically receive a support leg. A lever is pivotally mounted to the first end of the tubular sleeve. A suction cup is mounted on the second end of the tubular sleeve. A linkage member extends between the lever and a peripheral edge of the suction cup. Upon the lever being pivoted, a force is exerted by the linkage member drawing the peripheral edge of the suction cup away from a surface to which it is adhering until suction maintaining the suction cup in position is released.

Although beneficial results may be obtained through the use of the suction cup release mechanism, as described above, problems can be experienced with one of the suction cups readhering to the surface. This can be extremely annoying when a person is endeavouring to lift a chair out of a bathtub. Even more beneficial results may, therefore, be obtained when means is provided to maintain the lever in a suction cup release position. There are a number of alternate means which can be utilized. A preferred means involves a lever having a contact portion which engages a detent on the tubular sleeve thereby maintaining the lever in a suction cup release position.

Although beneficial results may be obtained through the use of the suction cup release mechanism, as described above, it is advantageous to be able to adjust the length of a support leg while the suction cups are still firmly attached to a surface, such as a bathtub. Even more beneficial results may, therefore, be obtained when the tubular sleeve has a plurality of transverse apertures. The transverse apertures receiving pins thereby permitting relative telescopic adjustment of the tubular sleeve and the support leg.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
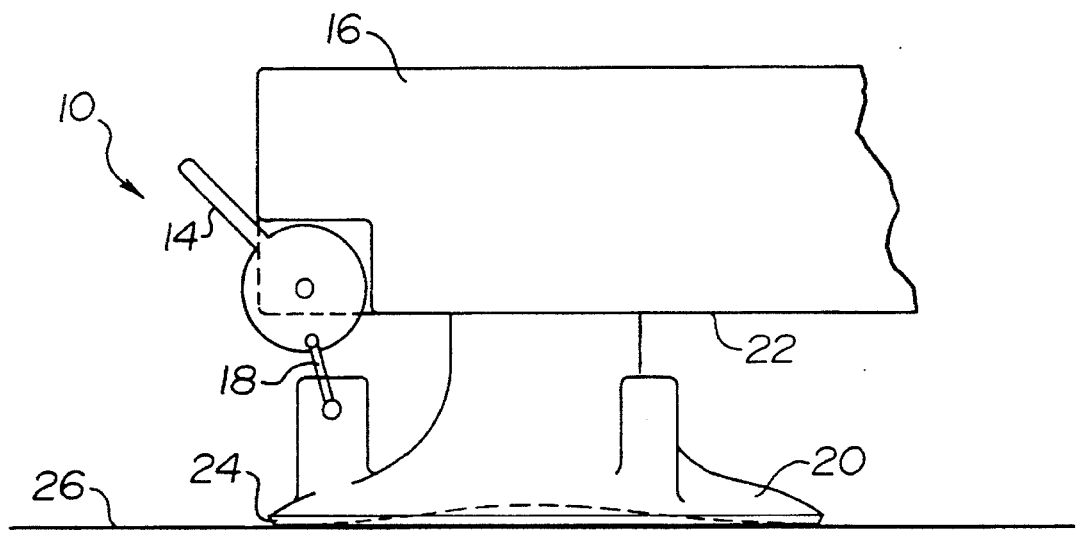
FIG. 1 a side elevation view of a first embodiment of a suction/cup release mechanism constructed in accordance with the teachings of the invention.
Figure 2:
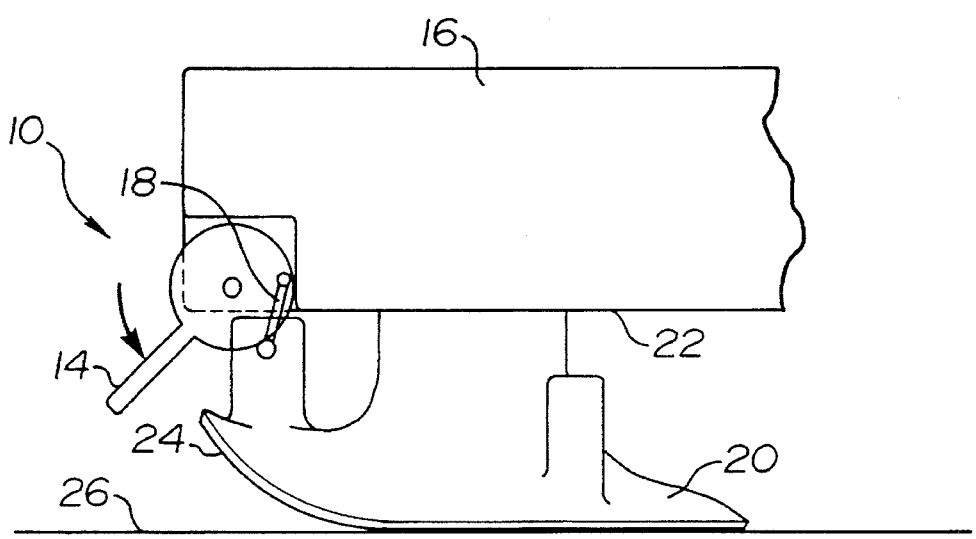
FIG. 2 is a side elevation view of the suction cup release mechanism illustrated in FIG. 1, in a suction cup release position.

The first embodiment and second embodiment of a suction cup release mechanism generally identified by reference numerals 10 and 12, respectively, will now be described with reference to FIGS. 1 through 7. First embodiment 10 is illustrated in FIGS. 1 and 2. Second embodiment 12 is illustrated in FIGS. 3 through 7.

Referring to FIGS. 1 and 2, suction cup release mechanism 10 (the first embodiment) consists of a lever 14 pivotally mounted to a support 16, such as a base of a chair. A linkage member 18 extends from lever 14 to a suction cup 20 at a remote end 22 of support 16. Linkage member 18 is secured to a peripheral edge 24 of suction cup 20.

The use and operation of suction cup release mechanism 10 will now be described with reference to FIGS. 1 and 2. Upon lever 14 being pivoted, a force is exerted by linkage member 18 to draw peripheral edge 24 of suction cup 20 away from a surface 26 to which it is adhering until suction maintaining suction cup 20 in position is released.

Figures 3, 4:
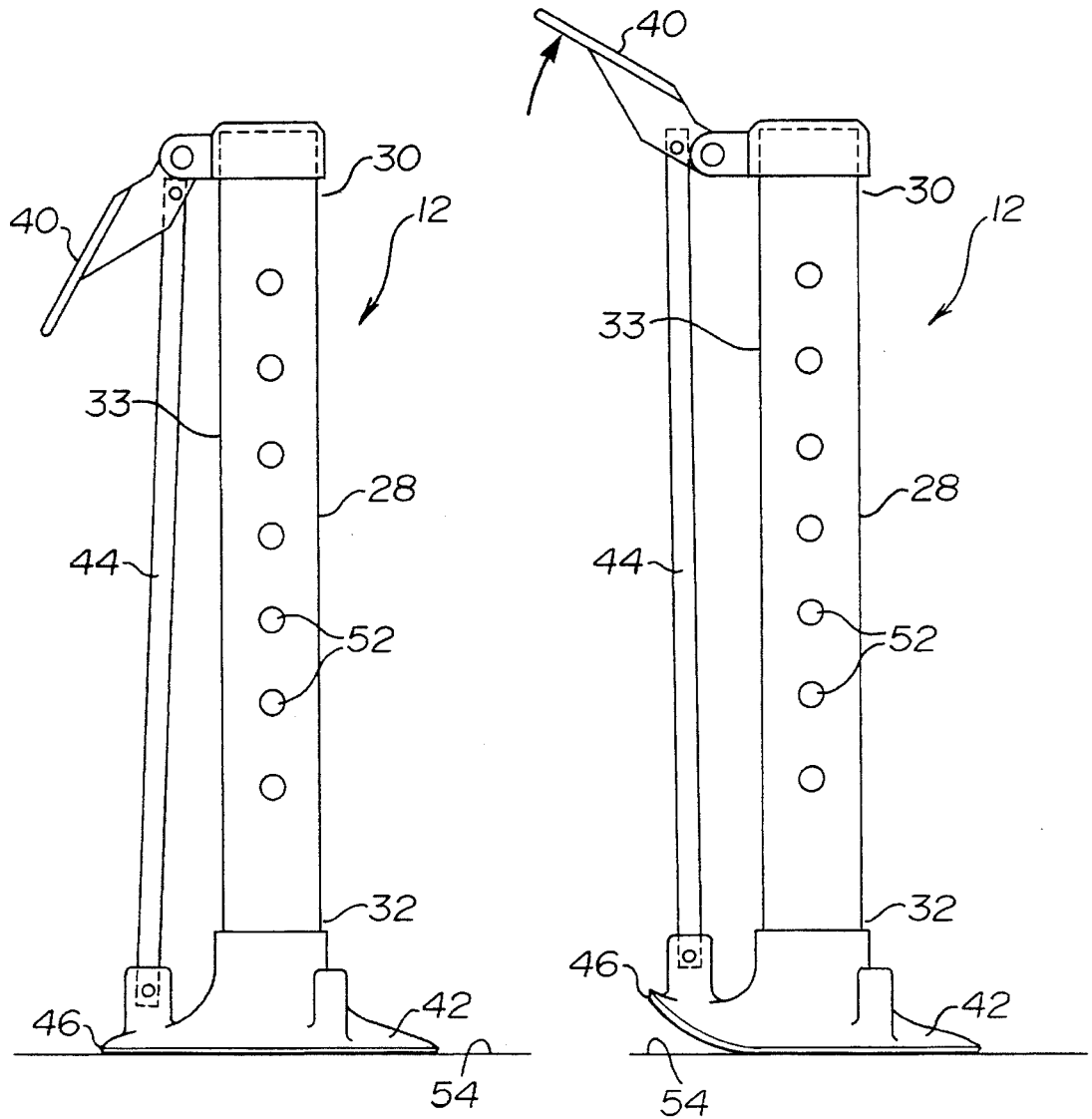
FIG. 3 is a side elevation view of a second embodiment of a suction cup release mechanism constructed in accordance with the teachings of the invention.
FIG. 4 is a side elevation view of the suction cup release mechanism illustrated in FIG. 3, in a suction cup release position.
Figure 5:
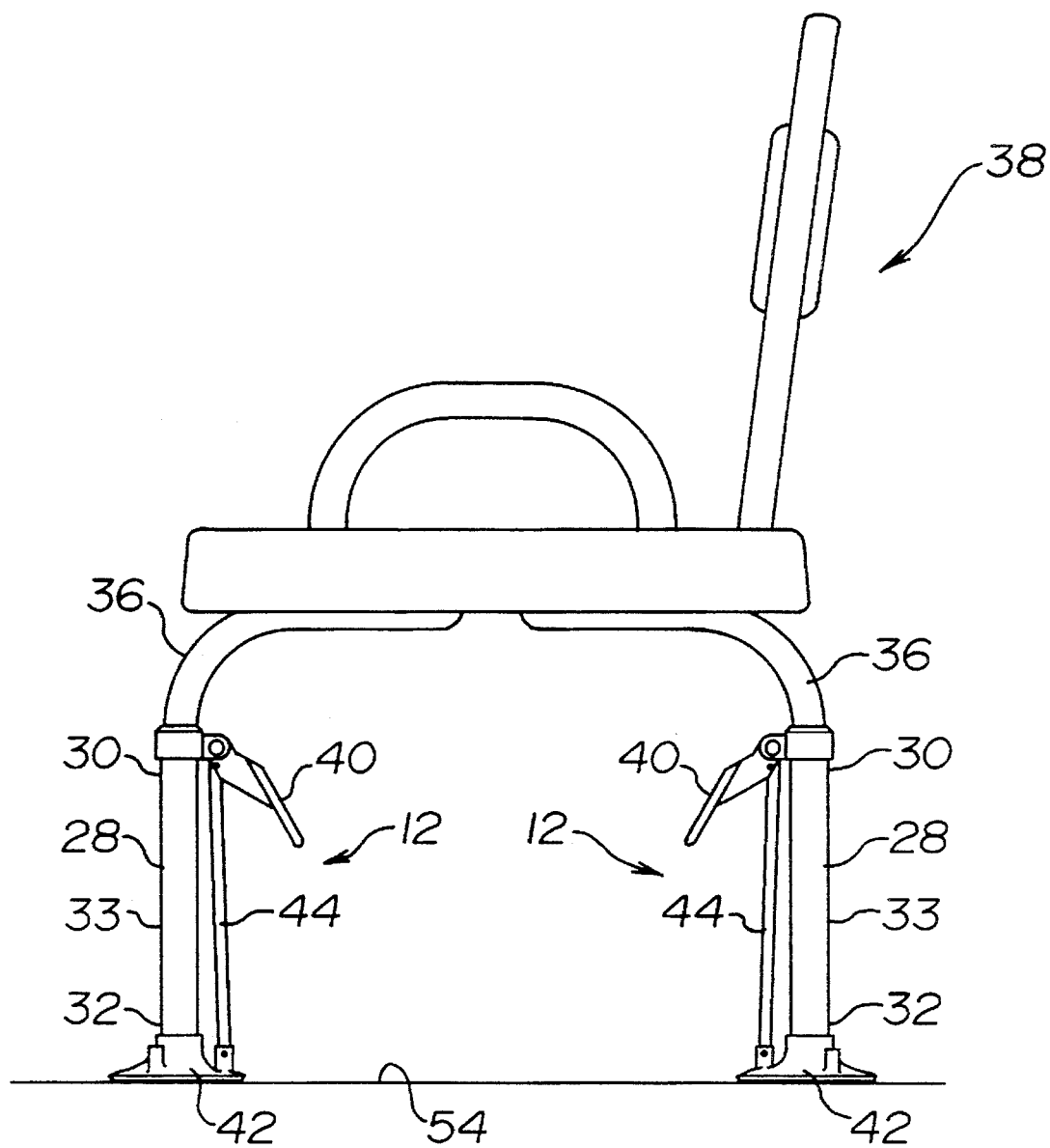
FIG. 5 is a side elevation view of a chair with the suction cup release mechanism illustrated in FIG. 3 attached to support legs.
Figure 6:
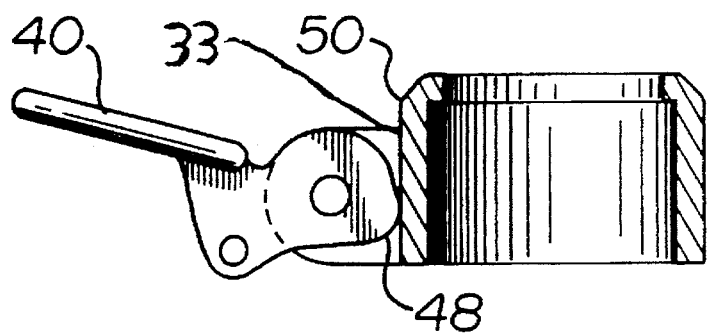
FIG. 6 is a side elevation view in longitudinal section of a portion of the suction cup release mechanism illustrated in FIG. 3.
Figure 7:
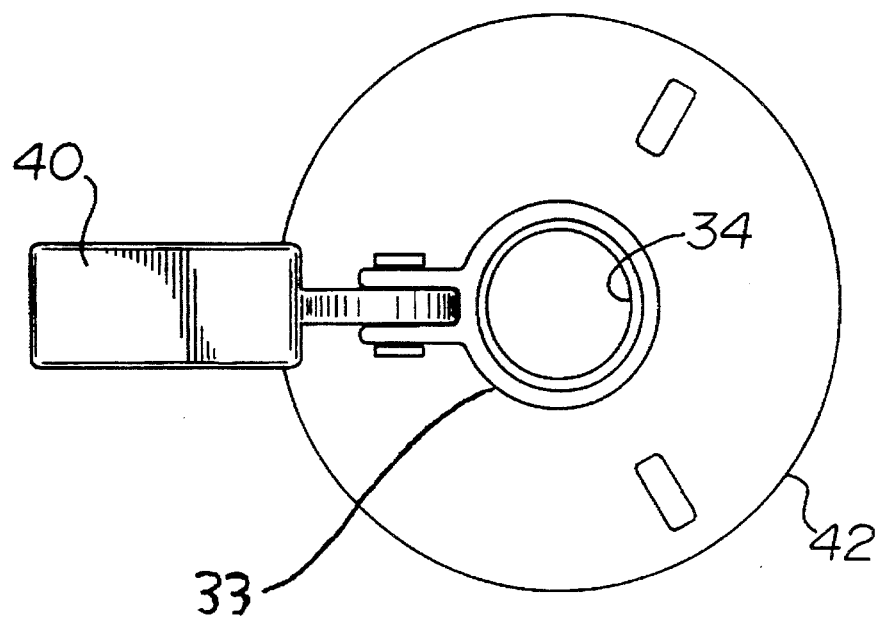
FIG. 7 is a top plan view of the suction cup release mechanism illustrated in FIG. 3.

Referring to FIGS. 3 and 4, suction cup release mechanism 12 (the second embodiment) includes a tubular sleeve 28 having a first end 30, afirst end 30, a second end 32, and an exterior surface 33. Referring to FIG. 7, suction cup release mechanism 12 has an interior bore 34. Referring to FIG. 5, it can be seen how interior bore 34 is adapted to telescopically receive a support leg 36. In FIG. 5 support leg 36 is for a chair 38, although the teaching is equally applicable to other furniture or products having support legs. Referring to FIGS. 3 and 4, a lever 40 is pivotally mounted to exterior surface 33 of first end 30 of tubular sleeve 28. A suction cup 42 is mounted on second end 32 of tubular sleeve 28. A linkage member 44 extends between lever 40 and a peripheral edge 46 of suction cup 42. Referring to FIG. 6, lever 40 has a contact portion 48 which engages a detent 50 on exterior surface 33 of tubular sleeve 28 when lever 40 is raised to maintain lever 40 in the raised or suction cup release position. Referring to FIGS. 3 and 4, tubular sleeve 28 has a plurality of transverse apertures 52. A locking pin (not shown) may be inserted into a selected one of transverse apertures 52, to maintain tubular sleeve 28 in a selected telescopic position relative to support leg 36.

The use and operation of suction cup release mechanism 12 will now be described with reference to FIGS. 3 through 7. Upon lever 40 being pivoted, a force is exerted by linkage member 44 drawing peripheral edge 46 of suction cup 42 away from surface 54 to which it is adhering until suction maintaining suction cup 42 in position is released. Referring to FIG. 6, the engagement between contact portion 48 of lever 40 and detent 50 on tubular sleeve 28 maintains lever 40 in the raised or suction cup release position. Referring to FIGS. 3 and 4, by removing the locking pin (not shown) from transverse apertures 52, a relative telescopic adjustment may be made of tubular sleeve 28 and support legs 36. This enables the height of chair 38 to be adjusted while suction cups 42 are still firmly adhering to surface 54.

Suction cup release mechanisms 10 and 12, as described above, provides a means for grasping the peripheral edge of the suction cup and a mechanical advantage with respect to the force required to release the suction that maintains the suction cup in position. It will be apparent to one skilled in the art that modifications may be made to the illustrated embodiment without departing from the spirit and scope of the invention as defined by the claims.

The embodiments of the invention in which an exclusive property or privilege is claimed are as follows:

1. A suction cup release mechanism, comprising:
   a. a tubular sleeve having a first end, a second end, an exterior surface and an interior bore adapted to telescopically receive a support leg;
   b. a lever pivotally mounted to the exterior surface at the first end of the tubular sleeve;
   c. a suction cup mounted on the second end of the tubular sleeve; and
   d. a straight rigid linkage member extending between the lever and a peripheral edge of the suction cup such that upon the lever being pivoted, a force is exerted by the linkage member drawing the peripheral edge of the suction cup away from a surface to which it is adhering until suction maintaining the suction cup in position is released.

2. A suction cup release mechanism, comprising:
   a. a tubular sleeve having a first end, a second end, an exterior surface and an interior bore adapted to telescopically receive a support leg;
   b. a lever pivotally mounted to the exterior surface at the first end of the tubular sleeve;
   c. a suction cup mounted on the second end of the tubular sleeve; and
   d. a straight rigid linkage member extending between the lever and a peripheral edge of the suction cup such that upon the lever being pivoted, a force is exerted by the linkage member drawing the peripheral edge of the suction cup away from a surface to which it is adhering until suction maintaining the suction cup in position is released; and
   e. the lever having a contact portion which engages a detent on the exterior surface of the tubular sleeve thereby maintaining the lever in a suction cup release position.

3. A suction cup release mechanism, comprising:
   a. a tubular sleeve having a first end, a second end, and an interior bore adapted to telescopically receive a support leg;
   b. a lever pivotally mounted to the first end of the tubular sleeve;
   c. a suction cup mounted on the second end of the tubular sleeve;
   d. a straight rigid linkage member extending between the lever and a peripheral edge of the suction cup such that upon the lever being pivoted, a force is exerted by the linkage member drawing the peripheral edge of the suction cup away from a surface to which it is adhering until suction maintaining the suction cup in position is released; and
   e. the tubular sleeve having a plurality of transverse apertures, the transverse apertures receiving pins thereby permitting telescopic adjustment of the tubular sleeve in relation to the support leg.

* * * * *